United States Patent [19]

Newell

[11] Patent Number: 4,953,202
[45] Date of Patent: Aug. 28, 1990

[54] TELEPHONE LINE ACCESS CONTROL

[76] Inventor: Terence J. Newell, 271 Clarendon Park Rd., Leicester, Great Britain

[21] Appl. No.: 143,391

[22] Filed: Jan. 13, 1988

[51] Int. Cl.$^5$ ............................................. H04M 1/66
[52] U.S. Cl. ..................................... 379/200; 379/188; 379/189
[58] Field of Search ................. 379/200, 198, 188, 189

[56] References Cited

U.S. PATENT DOCUMENTS

| | | | |
|---|---|---|---|
| 4,099,033 | 7/1978 | Murray | 379/188 |
| 4,332,982 | 6/1982 | Thomas | 379/200 |
| 4,358,640 | 11/1982 | Murray | 379/200 |
| 4,482,787 | 11/1984 | Sagara et al. | 379/200 |
| 4,612,419 | 9/1986 | Smith | 379/200 |
| 4,748,657 | 5/1988 | Rudd et al. | 379/189 |

FOREIGN PATENT DOCUMENTS 2086187  5/1982  United Kingdom ............... 379/200

Primary Examiner—Thomas W. Brown
Attorney, Agent, or Firm—Saidman, Sterne, Kessler & Goldstein

[57]  ABSTRACT

A telephone line access control or call-barring unit operates on the monitor-and-clear principle to achieve selective call barring. The unit monitors dialled pulses being sent to an exchange, and recognizes a four-digit security number or authorization code intended to be known only to authorized users for bypassing the call-barring function. It also recognizes one or more two-digit or three-digit access codes for programming the call-barring unit to enter various different call-barring modes. The programmablity is purely in response to dialled numbers from any telephone connected to that particular line, and includes the option of changing the authorization code.

29 Claims, 4 Drawing Sheets

TELEPHONE LINE ACCESS CONTROL

DESCRIPTION

1. Field of Invention

The invention relates to telephone line access controls, including devices and systems, for use in restricting the use of telephones to authorized persons or in restricting the range of calls that may be made from those telephones.

2. Background of the Invention

In this specification and claims certain terms are for convenience used in a generic sense even though there may be more specific meanings.

The term 'line' refers usually to the actual telephone line but should be construed for the purpose of this Application as including any channel accessable to a user for transmitting signals.

The line is part of a network which includes telephones and exchange and covers parts of the line internally of and externally of a building.

'Seizing' and 'releasing' of a line normally results from the actual lifting of a handset out of or into a cradle, but these terms should also be construed to cover any manner in which a line can be influenced to prepare it for signal transmission through the network or to end such preparation. 'Seizing' and 'releasing' can hence also be effected electronically, for example through MODEMs.

'On-hook' and 'off-hook' are terms identifying the physical relationship between a telephone handset and its hookswitch or cradle. 'On-hook' indicates that the handset is in position on its hookswitch and 'off-hook' indicates that the handset has been lifted and is in use. Both conditions can be monitored at the exchange by sensing the resistance across the line, and are simulated by all telephone instruments that employ electronic means for seizing a line (such as MODEMs and telephone sets with an on-the-hook dialling facility). In this disclosure, the terms 'on-hook' and 'off-hook' are used to identify the line conditions sensed by the exchange rather than the physical condition of a hookswitch of a telephone set connected to the line.

'Dialling' normally refers to the actual turning of a dial or the keying in of a push button pad following line seizure. The term is to be construed as covering any manner of inputting numerical data into the telecommunication network, whether it be a dialling code or any other numberical input, whether pulses or frequency encoded. The term 'dialling' covers voice or other remote operation and extends to numerical codes not part of the usual dialling codes.

In modern telecommunications practice telephones may be equipped for direct dialling out without using an operator or internal exchange. Thus there is no monitoring of outgoing calls and there is risk of abuse.

Telephone line access control systems for the selective barring of certain classes of call are of either of two principal types: monitor-and-clear systems (referred to herein as call monitoring systems) and store-and-forward systems. A call monitoring system is arranged in parallel with a telephone line and monitors the sequence of digits dialled and sent down the line. When the system is activated to bar a particular call, the call is cleared by simulating the replacement of the handset to provide line release. A store-and-forward system is arranged in series between the telephone and the exchange line and intercepts, analyses and memorizes the numbers dialled. When a call is to be permitted, the memorized number is then sent down the line to the exchange. Of the two types of system, the call monitoring system clearly has the most interaction with the exchange.

Telephone line access control call monitoring systems are known from U.S. Pat. No. 4,346,264: GB No. 2,123,254 and GB No. 2,133,250. Most pertinent to the invention are U.S. Pat. No. 4,099,033 and U.S. Pat. No. 4,358,640 (Murray I and II) best read in tandem.

Murray I discloses a system in which a pre-selected code number can switch a telephone line access control between specific modes i.e. Inhibit, normal and local. The control simulates the replacement of a hand set (page 7 line 7) to prevent further dialling and to clear the call at the exchange in the appropriate circumstances. The mode changes are effected by dialling the user's own number to inhibit, thus preventing all calls. From this inhibit mode other 7-digit codes can be used for establishing a normal (unrestricted) mode or a local mode.

Murray II discloses that one of the unused 3-digit codes reserved by the telephone authorities could be used to inhibit (page 3 line 9). This permits line release by simulating handset replacement after 3-digits. Routine use could involve: placing the phone off-hook and inputting of the 'normal mode' code; phone placing the on-hook to disconnect the number at the exchange; phone pick up and dialling of the desired number; phone on-hook; phone pick up and dialling of the 'inhibit' code; concluded by final phone-down. The Murray systems cannot change the authorization code (i.e. for local or normal mode operation) easily. If a security breach were to occur, resulting in unauthorized knowledge of that authorization code, its replacement would require EAROM programming.

The invention aims to provide a call monitoring system of telephone line access control which can be used more easily than the Murray systems and which is user-reprogrammable.

SUMMARY OF THE INVENTION

The invention utilizes both an authorization code and one or more access codes. The access code or codes permit the user to select the extent of restriction that will be applied to subsequently dialled numbers. Different degrees of restriction that are possible include:

(a) no call restriction;
(b) only local calls permitted;
(c) only local and long-distance calls permitted: international calls prohibited;
(d) only calls to preselected numbers permitted;
(e) no outgoing calls permitted except for calls to the emergency services.

Clearly the above classes of call restriction can be varied to suit the telephone networks of particular countries. For example, class (b) restriction, to local calls only, may have to include a prohibition on establishing a connection to an exchange operator who may be able to set up a long-distance or international call if so requested.

The above access codes do not require a high level of security, and simple and easily-remembered 2-digit or 3-digit codes are suitable. Those access codes may be chosen from the 2-digit and 3-digit codes not already reserved by the telephone authority.

An authorized user of the telephone line must be able to amend or bypass the call restricting status of the call barring system, and to that end an authorization code is provided. That is a personal identification number or PIN which it is intended should be known only to specific authorized users. For user-acceptability the authorization code should be as short as possible, and in any case it should be one or more digits less than the minimum subscriber number length in the telephone network. Four-digit authorization codes have been found to be very suitable. Such a code car be selected freely without risking the accidental dialling of a subscriber number. At the same time the control permits the easy changing of this number by a person aware cf the previous authorization code. Hence the authorization code can be changed regularly.

Breaking of the authorization code can be hindered by ensuring that line release occurs automatically at the end of dialling a number of digits corresponding to the number of digits in the authorization code whether or not the correct digits were dialled. Thus a person seeking to break the system by random dialling would not receive any information as to which digit was incorrect. Thus a small number, such as 4 digits, could provide an adequate level of security.

In addition the control may be equipped to release the line temporarily, when in a call restricting mode, after the monitoring means has identified a number of digits one or more digits less than the short dialling codes used for routine operation by the telephone authority (i.e. operator or directory enquiries). Hence in the UK such a temporary release may be effected after 2 digits.

As to the changing of the authorization code using dialled line signals, first it is necessary to ensure that the new authorization code is inserted only by the authorized person. This is achieved by enabling the reprogramming means only when the call barring means is already cleared of all call restriction by the input of the extant authorization code. In addition, the reprogramming means is enabled only after the user dials the access code or an appropriate one of the access codes. In a preferred embodiment the new authorization code must then be inserted immediately, and further changes are made impossible by placing the phone on-hook.

Thus the invention permits an authorization code to be changed by phone pick up: dialling of the previous 4-digit authorization code and awaiting the dialling tone; dialling of the appropriate access code; dialling of the new authorization code; and placing the phone on-hook.

In its preferred form the invention depends for the facility of its operation and its security on the ability to prevent the transmission of successive digits as a single string to the exchange (where spurious unwanted calls might be generated) by a first temporary line release during the course of dialling the authorization code, by a second temporary line release at the end of dialling the authorization code and by a third temporary line release at the end of dialling the access code or any of the access codes. At the same time the control monitors such strings in disregard of such line release, whilst responding to the phone off-hook or on-hook condition. This is achieved by making the control monitor line condition. Thus when the telephone is on-hook a high resistance is placed across the telephone-exchange lines but when the phone is off-hook a low resistance lies across the exchange lines. The change of resistance at the telephone is monitored both in the exchange and in the control of the invention and is indicative of the phone on-hook or off-hook condition. The temporary line release created by the control of the invention, for suppressing processing of a dialled sequence of numbers at the exchange, is effected by disconnecting one line so providing an infinite resistance across the exchange lines. This characteristic is recognized by the exchange as phone on-hook condition and causes the exchange to clear any existing call processing. However the same characteristic is ignored by the control and does not cause re-initialization of the control Thus re-initialization only happens when the phone first goes to its off-hook condition and not after a control-induced temporary line release.

The control operates by monitoring the line and need not be associated with a particular telephone set, although it is possible for the control to be part of a set. Thus the call barring function cannot be overcome by switching telephone sets if a common access control is used on the exchange line to which a number of sets in an office are connected. The control operates in all instances by temporarily releasing the line so leaving the line available for incoming calls even if the access control is activated.

If desired the access control of the invention can be arranged to revert automatically to the call barring mode or to one of the call barring modes when the phone is placed on-hook upon termination of an outgoing call. Similarly it may be arranged to assume automatically its call barring mode or one of its call barring modes when the phone is placed on-hook after reprogramming to insert a new authorization code.

Different features of the invention are explained in more detail by reference to the following description of the drawings.

DRAWINGS

DESCRIPTION WITH REFERENCE TO DRAWINGS/OVERALL ARRANGEMENT

Figure 1:
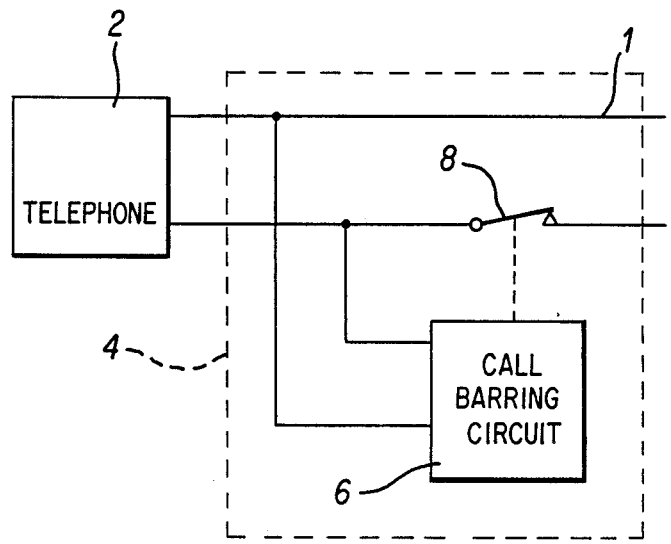
FIG. 1 shows schematically the overall lay-out of a telephone system including an access control system of the invention.

With reference to FIG. 1, the telephone 2 is of conventional push-button design. At the junction box 4 a call-barring circuit 6 according to the invention is provided, which monitors an exchange or data line to detect dialled pulses from the telephone. The circuit 6 may be of discrete components and externally powered. However preferably the circuit is largely of an integrated design using one or more integrated circuits as will be explained, with a power consumption sufficiently low to use and operate on the exchange line power supplied to the telephone 2.

The circuit 6 operates a switch 8 for triggering temporary line release. The switch 8 can be used for temporarily influencing the data-line by opening the line so giving rise to an infinite resistance to cause the network to regard any unauthorized call as terminated, causing the line to be effectively released so that any digits dialled through to the exchange are cleared. The circuit does not itself terminate the call but acts by briefly disconnecting the line.

The system does not interrupt incoming calls at all and need not be physically associated with a particular telephone. Thus the system does not act to disable an individual phone set totally or to block the line which it monitors. The circuit 6 and switch 8 (which may be of relay or solid state type) can be mounted in the socket of the junction box 4. If any attempt is made to physically remove the circuit 6, a considerable amount of work is required both in the removal and in reconnecting the phone line, thus deterring abuse.

The circuit 6 monitors the line 1 which can serve one or more connected phone sets.

MAIN CIRCUIT FUNCTIONS

Figure 2:
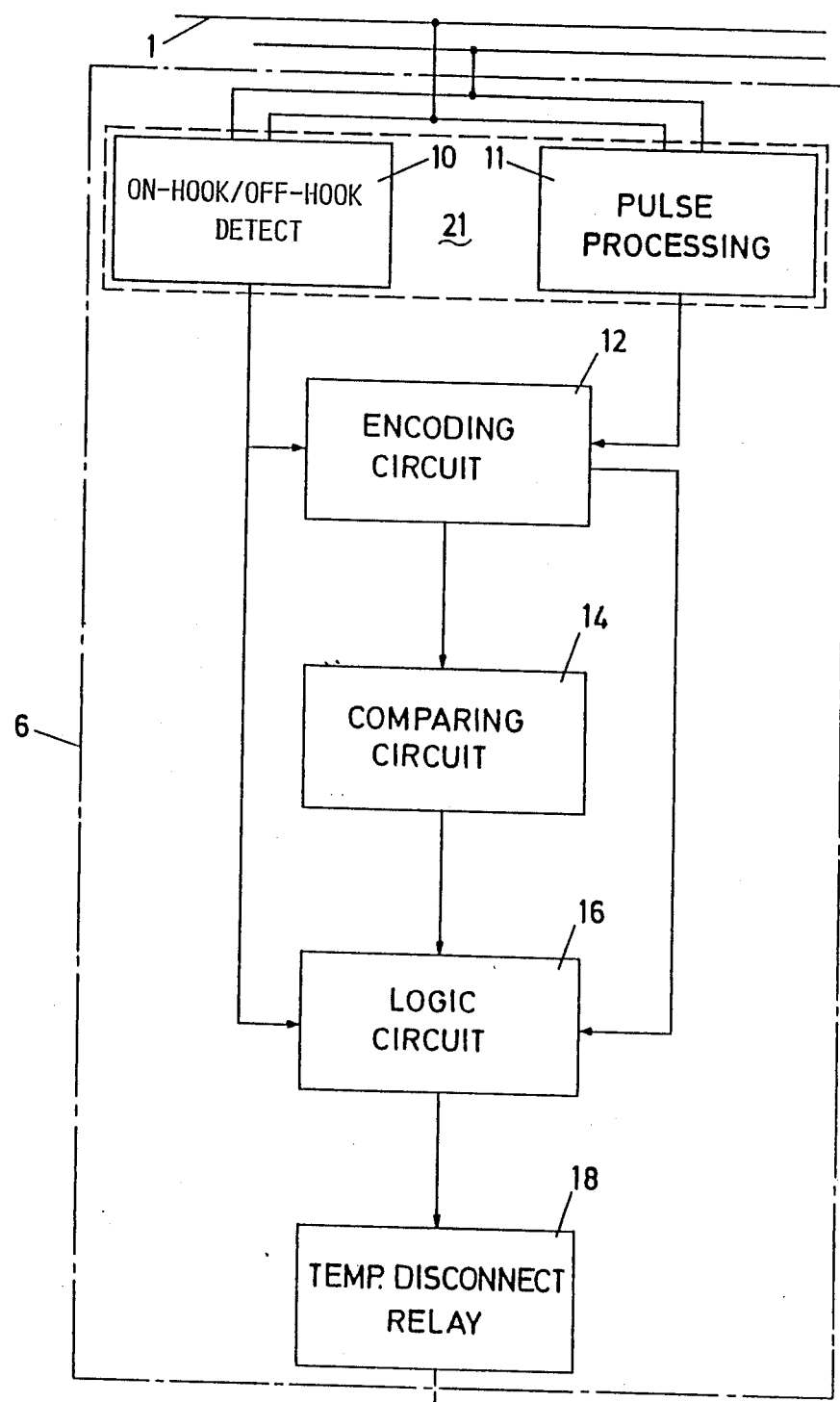
FIG. 2 shows a block diagram of the circuit of the control system of FIG. 1.

With reference to FIG. 2, the circuit 6 has a series of components 21 monitoring the exchange line with the dual function of detecting whether the telephone is off-hook or on-hook and whether the line has hence been seized or released, and for processing input pulses dialled out on the line 1 when the line has been seized. The monitoring components 21 include an off-hook/on-hook detection circuit 10, and a pulse processing circuit 11. The off-hook/on-hook detection circuit 10 operates by monitoring the line condition, as is well known in the art and described more fully below. Outputs from components 21 are supplied to encoding circuitry 12 to distinguish appropriate numbers which have been dialled out. The numbers are compared in a comparison circuit 14 which, dependant on the nature of the numbers, operates logic circuitry 16 at suitable intervals. When appropriate, the logic circuitry enables various circuit components and operates a relay 18 to cause the switch 8 to trigger temporary telephone line release.

In this particular embodiment the circuit has been designed to provide certain functions and the main principles of the design are next outlined before describing the circuit 6 in detail.

The circuit 6 can be set to permit unrestricted access by dialling in an authorization code, in which case the call barring control is said to be 'deactivated'. The circuit 6 can also be set to restrict access by dialling in an activation code in which mode the circuit is said to be activated. In any event, whether the circuit is activated or deactivated, the line is normally in a condition permitting outgoing calls (and so the passing to the exchange of any dialled activation or authorization codes). When the circuit 6 is activated it causes the line to be temporarily released during dialling to prevent the completion of an attempted outgoing call or to prevent any dialled activation or authorization code, intended to influence the circuit 6, from being regarded by a connected telephone exchange as part of a normal dialling code. To minimize or eliminate any restriction on outgoing calls when the call barring control is deactivated, the activation code is selected to be a short sequence of numbers which does not normally occur at the start of a dialling code, such as the UK code '1,1,'.

The circuit 6 stores the authorization code in a random access memory. The circuit 6 hence includes components for enabling access to RAM to permit a change of code. In the illustrated embodiment, the authorization code can only be changed by a user who has used the previously correct authorization code, thus preventing unauthorized code change.

The circuit 6 is also adapted to permit calls to the emergency services at all times, for example in the UK by recognition of the emergency services number '999'.

PHONE USE DETECTION

Figure 3:
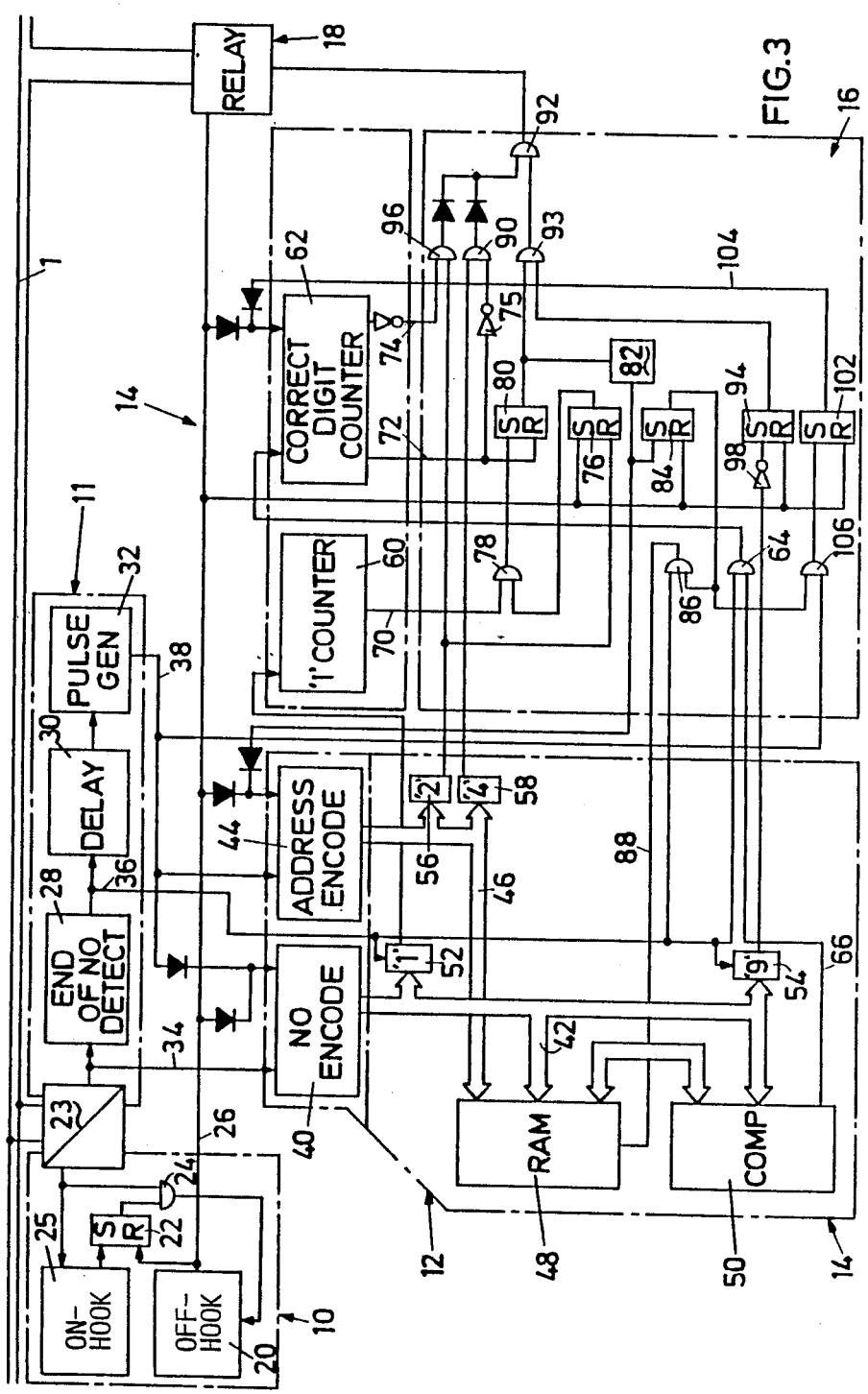
FIG. 3 shows a circuit diagram of the circuit of FIG. 2.

With reference to FIG. 3, the circuit part 21 for monitoring line signals includes a line pulse detector and modifier 23. A line release or on-hook down detector 25 monitors the resistance across the lines and provides an output pulse to set a latch 22 high when the phone is on-hook, when the phone line changes from 50 volts R.M.S. (Root Mean Square) pulse transmitting mode to a 10 V d.c. R.M.S. condition. When the phone line is seized, an AND gate 24 enabled by the latch 22 passes a signal to a line seizure or off-hook detector 20, again from the change in line condition. When the off-hook detector 20 first recognizes the off-hook condition, a single prolonged reset pulse is passed by the off-hook detector 20 along to various devices, the pulse being of a sufficient length to avoid any line noise resulting from seizing of the line. At the same time, the latch 22 is reset low until the phone line is next released. The circuit 6 can in this way be operated so that it is ready to process any monitored dialled signals from a properly initialized condition, and can be made inoperative when the phone is placed on-hook.

PULSE PROCESSING

The circuit part 21 also shapes any data pulses and supplies an interval detector 28 which detects the end of a train of pulses (normally sent at a frequency of 10 per second) and hence, a pulse delay device 30 and a pulse generator 32. The pulse processing circuitry provides an output 34 of shaped pulses, a non-delayed end of dialled signal output 36, indicating the end of a digit, and an output 38 delayed slightly until after the end of a dialled digit. Thus clean pulses can be presented for encoding and delayed and non-delayed clock pulses can be obtained to permit the circuit to encode, read, compare and act on each successive dialled input signal.

ENCODING

The encoding circuit 12 includes a number encoder 40 receiving the output 34 and outputting to a data bus 42 a binary coded number corresponding to the number of pulses in the pulse train of a line signal passed along line 1. The encoder 40 counts the pulses and outputs any binary code representing digits from 0 to 9 to the bus. There is also provided an address encoder 44 which receives the output 38 following each dialled digit and outputs to an address bus 46 a binary coded number corresponding to the number of the dialled digits.

COMPARING CIRCUITRY

The comparing circuitry 14 includes a random access memory 48. A comparator 50 receives the digit and address of the successive digits of an authorization code stored in the memory 48 and also the digits and address of the successive digits dialled and passed along the line 1 to compare them. The encoding circuit 12 includes a detector 52 for detecting if the dialled digit is 1, a detector 54 for detecting if the dialled digit is 9, a detector 56 to detect when two digits have been inputted and a detector 58 to detect when four digits have been inputted. The circuit 14 further includes a '1' counter 60 connected to the '1' detector 52, and a correct digit counter 62 connected through an enabling AND gate 64 with a comparator output 66. Thus each encoded dialled signal is processed to increment, if appropriate, the counters 60 and 62. When the signal corresponds to the part of the authorization code with the same address then a correct digit pulse is provided by the comparator output 66 to increment the counter 62. The encoders 40, 44 and the counters 60 and 62 may be of similar structure but are connected differently on the input and output side to perform their respective functions.

LOGIC CIRCUITRY

The logic circuitry 16 contains a number of low power consumption latches and gates which process counter outputs 70, 72 and 74 and the condition of the detectors 52, 54, 56 and 58 so as to selectively trigger the relay 18 which actuates the switch 8 which causes the temporary release of the telephone line 1.

OPERATION

Initialization

The user picks up the telephone handset causing the line 1 to be seized, whereupon after a short delay to blank out noise from picking up of the phone, an initialization signal on the initialization line 26 causes the circuit 6 to be initialized.

ACTIVATION

The call-barring circuit 6, shown in block diagram form in FIG. 3, illustrates only the most basic call-barring function provided by the invention. Only one access code is allowed for, so that the circuit is either deactivated in which case there is no restriction on outgoing calls; or activated in which case all outgoing calls are barred with the exception of calls to the emergency services. The circuit illustrated is one designed for the UK. where the emergency services' number is '9,9,9'. In the embodiment illustrated in FIG. 3, the access code necessary to activate the call-barring function is '1,1', which is a number which returns the 'number unobtainable' tone from the exchange.

In modifications to be described below, there is more than one access code, to establish different activation modes.

In FIG. 3, a latch 80 of the logic circuit 16 serves to provide a bistable access mode control latch. Assuming that the circuit was last de-activated by a sequence of operations explained later, the latch 80 is in a reset condition and has a low output. In this mode AND gates 93 and 92 and relay 18 are naturally disabled. The initialization has set a latch 76 for recording the occurrence of activation so that its output is high.

The user then dials out '1' and '1', being the access code.

The '1' counter 60 is loaded by the '1' detector 52 which is clocked by the 'dialled signal completed' output 36. After the second '1', the output 70 from counter 60 goes high. An AND gate 78 is enabled by the latch 76 so that the access mode control latch 80 is reset, its output going high. Thus latch 76 and gate 78 serve as means for activating the bistable access mode control latch 80.

The two digit detector goes high shortly afterwards as the address bus is clocked by the delayed 'dialled signal completed' line 38, causing the latch 76 to be reset, its output to go low and disabling the AND gate 78. Thus the latch 80 can only be set by two successive 1's without any prior digit. A dialling code containing two 1's but not at the start of a number cannot activate the access mode control. A repeated dialling '1,1' will not have the same effect as the AND gate 78 is disabled. The circuit will only process another '1,1' command after another initialization stage during which the latch 76 is reset. The latch 76 thus records that after initialization, the circuit 6 was changed from a de-activated to an activated mode. The two digit detector 56 and the latch 76 thus serve as means to allot two digit positions to the activation code upon line seizure.

If the user were to attempt to input 101 for example, after two digits the output 70 would still be low preventing enabling of the random access memory 48. By the time output 70 goes high, after the third digit, the two digit counter 56 has reset the latch 76 disabling the AND gate 78 and preventing opening of the memory 48. Thus dialling of codes incorporating '1's interspersed with other digits will not trigger activation.

The setting of the latch 80 by the '1,1' access code also has the effect of triggering a pulse generator 82 which in turn sets a RAM access control latch 84 and clears the address encoder 44.

After activation the user can wait until he hears the 'number unobtainable' tone to ensure that activation is completed.

The user then puts the telephone on-hook, releasing the line 1 and ensuring that the next time the circuit monitors any dialled signals, the circuit 16 will once more have been initialized following line seizure, resetting the latch 84 in the process. Of course the access code can be chosen to conform to the dialling code hierarchy adopted at a given network but also conforming to the above requirements i.e. short and not a dialling code in its own right.

INSERTING OR CHANGING AN AUTHORIZATION CODE

After activation by dialling the access code '1,1', the phone is not put down, leaving the output of the latch 84 set high. The 'number unobtainable' tone is awaited as before. The high output of the latch 84 enables an AND gate 86. The next four digits dialled will be entered along line 1 into the RAM 48. The user then puts the phone on-hook. The latch 84 is thus reset but the latch 80 is maintained in the set condition with the access control activated. Whilst inputting these four numbers the 'number unobtainable' tone will be maintained, preventing any call being established through the exchange.

From then on, outgoing calls are not possible unless the circuit 6 is de-activated as will be explained. The operation described serves either to insert the initial authorization code or to change that authorization code.

If, before dialling '1,1', the latch 80 had been in the only other condition possible that is to say set with its output high and not having been de-activated, then there would have been no change from low to high on the output of latch 80 triggering the pulse generator 82 and no enabling of the RAM 48. If '1,1' were dialled in this condition, the latch 76 would after initialization, enable AND gate 78 but the generator 82 would not set the latch 84 and any number dialled would not be put into RAM 48.

The output from the RAM access control latch 80 also enables a further AND gate 102 (reset upon initialization) whose output goes high to clear the correct digit counter 62 following setting of the latch 84 prior to authorization code insertion. This prevents the latch 80 from being reset by the high outputs generated by the comparator 50 in coincidental fashion during this operation. If the latch 84 does not permit RAM access, the latch 102 retains its low output. The latch 102 serves as the means for preventing the new authorization code inputted from acting to deactivate the access mode control means. Calls made subsequently to the insertion of a new authorization code will thus be restricted.

PHONE ON-HOOK

When the phone is put on-hook and the line is released, the latch 22 is operated by the detector to set the initialization line 26 high so as to reset all counters and encoders and to set and reset all latches as appropriate to prevent energization of the relay 18. Thus incoming calls can pass to the telephone through line 1 without interruption. If a new authorization code had been inserted immediately before putting the phone on-hook, this would have left the latch 80 in the set condition, resetting having been prevented by locking the correct digit counter 62 following setting of the latch 102. Thus the circuit 6 is activated whether by a '1,1' sequence alone or by that sequence followed by a freshly inserted authorization code.

UNAUTHORIZED DIALLING OUT

When the circuit is activated and another user next uses the telephone, then on dialling the output 66 will go high when a number and address of the dialled number corresponds to the number and address of the authorization code in the memory 48. When the user starts dialling with any one of the first four digits not identical to the authorization code, then after four digits, output 72 of correct digit counter 62 will still be high. An invert gate 75 thus enables an AND gate 90, the counter 62 not having received four successive pulses through output 66. When the four digit detector 58 goes high with a delay, the AND gate 90 enables the AND gate 92.

The latch 80 has a high output in the activated condition and (as will be explained) output from a latch 94 is also high, so that the AND gate 92 causes the relay 18 to be energized through AND gate 93. The line 1 is interrupted, causing line release, breaking the dialling sequence and forcing the user to give up or to try again by putting the phone on-hook and lifting the handset again to re-initialize the circuit. Thus, unless the correct authorization code is used, the circuit 6 will continue to be activated and prevent outgoing calls along line 1.

It is to be noted that the output of the latch 84 is low, disabling the memory 48.

As the system is a monitoring one, dialling codes containing three numbers could pass along line 1 before the relay 18 disconnects the line by virtue of the 4th digit detector 58 going high. To prevent this the counter 62 has an inverted output 74 which goes high when the first two digits of the authorization code have been dialled in conjunction with the two digit detector 56 and AND gate 96. Thus the line interruption will occur after the first two digits and after the four digits whether or not the digits are correct. However the circuit 6 remains activated because the temporary line release resulting in an infinite resistance does not re-initialize the circuit although it does clear the exchange end. A person seeking to find the code by trial and error will not be able to detect any difference in response between a correct and incorrect four digit code in that in either case a dialling tone will be heard at the end of the 4 digit input. However the subscriber code next inputted will be interrupted after the first four digits if the code is incorrect or will be connected after the full subscriber code if the authorization code inputted is correct.

DEACTIVATION

If the user dials the correct four digit authorization code, when the circuit 6 is activated, then after the fourth correct digit the output 72 goes low, resetting the output of the access mode control latch 80 low. The counter 62 is timed by the non-delayed end of dialled signal output 56 through an AND gate 64. The AND gates 90 and 96 are enabled shortly afterwards by the 2 and 4 digit detectors 56 and 58. Thus on completion of the fourth correct digit, the latch 80 is reset immediately but the outputs from AND gates 90 and 96 only go high with a short delay. Thus the relay 18 triggers release of the telephone line by the network exchange so as to end a dialling sequence prematurely as before but with the difference this time that the latch 80 is reset. Thus any dialling activity will from then on be without interruption, permitting unrestricted use of the telephone. The disconnection at the end of the de-activation by insertion of the correct authorization code ensures that the exchange does not treat the authorization code as part of the dialled code for making a telephone call and it is not necessary to put the phone down before proceeding further.

REACTIVATION

To re-establish access control, the user again keys in the access code '1,1' and puts the phone down. The output of the access mode control latch 80 is once more high. Use is henceforth only permitted after dialling of the authorization code.

EMERGENCY DIALLING

To permit dialling in emergencies when the circuit 6 is activated, emergency codes are recognized. The UK emergency code is '9,9,9' and so a simple arrangement can be used to bypass the access control and to avoid disconnection. Whenever a '9' is dialled the -detector 54 will output through an inverter 98 to keep the output of the AND gate 93 low, avoiding setting of a latch 94 (reset during initialization) and preventing energization of the relay 18. As soon as a non-'9' number is dialled, the emergency code by-pass latch 94 will be set, providing a high output, enabling the AND gate 93 to pass any signals for energizing the relay 18 generated in other parts of the circuit 6. Thus a '9,9,9' emergency call can be made without interruption or release of the phone line. For any other sequence of numbers, the access control system is operative. In networks outside the UK other numbers if repeated in the emergency code can be passed analogously without restrictions.

MODIFICATIONS

In the illustrated embodiment of FIG. 3, only one call barring mode is recognized, and therefore there is only one access code '1,1'. The latch 80 is a mode control latch the output of which is set high by the access code '1,1'.

In other modifications of the invention there may be more than one call barring mode, corresponding to different degrees of selective or total call barring. For example there can be different modes corresponding to 'local calls only' (no trunk, international or operator calls permitted), 'national calls only' (no international or international operator calls permitted) or 'permitted numbers only' (access permitted only to a limited number of subscribers in a repertory of permitted numbers). Each mode has its own access code which may be a 2- or 3-digit code, and each mode has its own mode control latch the output of which is set high by recognition of the respective access code. A typical programming combination would be as follows:

| Access Code | Call barring mode |
| --- | --- |
| '1,1' | total call barring |
| '1,1,2' | local calls only |
| '1,1,3' | national calls only |
| '1,1,4' | permitted numbers only |

A further access code, such as '1,1,5', could be provided for enabling access to a part of the circuitry used to reprogram the repertory of permitted numbers. Thus the reprogramming of that repertory can be achieved by use of the telephone dial or keypad in exactly the same way as all other user operations.

Although there is no harm in an unauthorized user being able to pick up a telephone and dial an access code when the access control is unlocked or deactivated, it would not be desirable for an unauthorized user to be able to change one call barring mode to another. Therefore the access control of the invention preferably permits the recognition of a valid access code only when the access control is deactivated. If the control is activated in one of its call barring modes and the authorized user wants to change to another call barring mode, he must therefore first dial the authorization code (which has the effect of unlocking or deactivating the control) and then dial the intended new access code.

Another call barring mode which may be incorporated would be a mode in which access restrictions are removed for only one call to a specified address.

It is also possible to inject a tone to indicate that the line is a restricted access line so as to prevent a reverse charge call being made.

Once the telephone handset is picked up in reply to a call, the line noise interpreted by the encoding circuit could be erroneously identified as a pulse train which could accidentally trigger the relay 18 causing a brief interruption of the call. This would not result in a permanent disconnection. Suitable circuitry can be used if required to prevent accidental triggering of temporary disconnection.

Either one set or a number of sets may be connected to a single telephone line equipped with a single control, or separate access controls may be associated with each extension to provide individual access control.

The system can be adapted for tone and frequency dialling systems. The system does not require physical linkage with the telephone set. Low power consumptions possibly with integrated circuits may permit the system to operate without external power sources. The system cannot be by-passed by switching telephone sets from socket to socket if the circuit is connected and mounted in the junction box bringing the exchange line into a building. The system provides a high degree of access control at a relatively low level of extra effort from the user. Because the line can be left without access control (after de-activation), efficient telephone use is possible as re-activation and authorization can be limited to when the authorized user thinks it is appropriate. It is not necessary to perform the authorization routine at every call.

The invention can be adapted for tone dialling by appropriate modification of the encoding circuitry. In an integrated circuit form preferably separate integrated chips are provided for encoding on the one hand (whatever tone or pulse frequency dialling methods are used) and the comparator and logic circuits operated by the encoded inputs on the other hand (which may be of a common design).

The invention can also be modified—suitably by the provision of a modified comparator and logic integrated circuit chip—to provide additional user facilities. For example, a circuit can be provided with a memory for permitted numbers which may be used even when the access control is activated. Such numbers may be those used for checking credit cards. Those numbers may be stored in a standard memory chip if desired, for automatic dialling out. Thus when the access control is in an activated mode permitting line connection to only the stored subscriber numbers, the first one or two dialled digits are used as an identification code to identify one of the repertory of stored subscriber numbers in the memory chip, and the dialling out is then achieved automatically from that memory chip.

It is also possible for an access control according to the invention to postpone temporary line release when the encoded signals do not match the authorization code, to permit the use of the telephone in restricted circumstances before the call is interrupted by temporary line release. For example the unauthorized user could be allowed a short duration call before line release is triggered. Alternatively the exchange-generated charge pulses could be counted, and an unauthorized user may be permitted to make calls up to a predetermined charge limit. Either the count of charge pulses could be reset to zero each call, or, preferably, the count could be cumulative so that after it reaches the predetermined limit the call in hand is terminated and all subsequent calls prevented except by the authorized user. In such a modification, means would be provided for setting or re-setting the predetermined charge limit and charge count.

Figure 4:
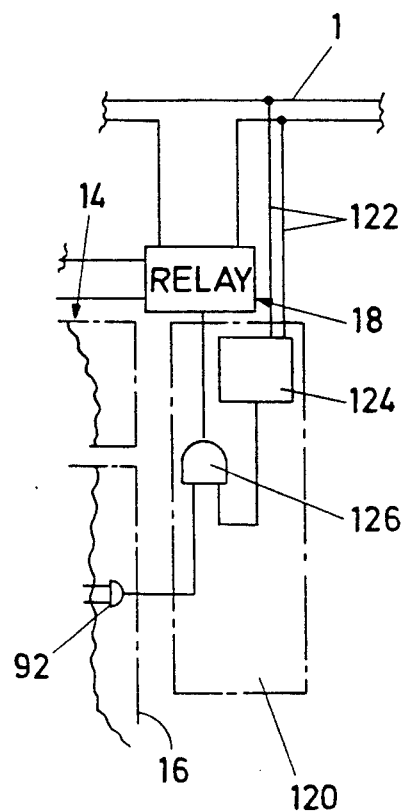
FIG. 4 shows part of the diagram of FIG. 3 but modified for additional user facilities.

FIG. 4 illustrates a possible modification to the circuit of FIG. 3 for such selective dialling restriction with the access control active. A circuit 120 receives a first input from AND gate 92 to record the absence or presence of activation. Lines 122 input charge pulses transmitted over the line 1 from the exchange and trigger detector and controller 124 establishes when permitted telephone charge levels are exceeded. As soon as gate 126 has received an input from AND gate 92 and the controller 124 the relay 18 is operated for temporary line release. The controller 124 can be arranged to be programmable in a manner analogous to the programming of RAM 48 responsible for authorization code retention. For example the user must first input the authorization code and then dial an access code for the memory of the controller 124. As before, an access code should be chosen which is not a dialling code, such as '1,3' or '1,1,6'. The controller memory can then be programmed to permit a set charge level by inputting the appropriate numerical limit. Activation could be effected by a '1,1' instruction. However preferably activation is by the same code as the access code used to enable programming. Other time or total cumulative charge restrictions could be programmed using other two- or three-digit numbers.

ADVANTAGES

The system restricts access for any form of telephone including push button telephones. Outgoing calls only are subject to the restriction. Selected emergency numbers can be made accessible at all times. All the vital operations of activating and deactivating and changing of memorized authorization codes can be performed using standard telephone sets, purely by monitoring line signals.

I claim:

1. A call barring device for a telephone line, comprising:
   means for monitoring and encoding dialled numeric signals sent by a telephone over the line;
   line release means for effecting temporary line release of the telephone line during or on completion of dialling to prevent at least some types of outgoing calls;
   first number recognition means for comparing dialled numeric signals with at least one access code;
   second number recognition means for comparing dialled numeric signals with a memorized authorization code;
   mode latch means latchable in any of a number of conditions including a deactivated condition and at least one activated condition which corresponds to a predetermined degree of call barring;
   mode control means for the mode latch means, for switching the mode latch means from its deactivated condition to an activated condition in response to recognition, by the first number recognition means, of a dialled access code corresponding to that activated condition, and for switching the mode latch means from an activated condition to its deactivated condition in response to recognition, by the second number recognition means, of a dialled authorization code;
   reprogramming means for changing the memorized authorization code to a sequence of dialled numeric signals recognized by the monitoring and encoding means, the reprogramming means being enabled in response to recognition, by the second number recognition means, of the dialled authorization code followed by recognition, by the first number recognition means, of an appropriate dialled access code; and
   means for triggering the line release means when the mode latch means is in an activated condition denying access to selected telephone numbers or classes of telephone numbers and the monitoring and encoding means recognizes a dialled number to which access is to be denied, or when the mode latch means is in an activated condition and the second number recognition means recognizes the dialled authorization code, or when the mode latch means is in its deactivated condition and the first number recognition means recognizes a dialled access code, or when the reprogramming means is enabled and the means for monitoring and encoding has recognized a sequence of dialled numeric signals corresponding to the newly memorized authorization code.

2. A call barring device according to claim 1, wherein the triggering means is also effective to trigger the line release means, when the mode latch means is in an activated condition, after each two dialled numeric signals recognized by the means for monitoring and encoding.

3. A telephone line access control for preventing unauthorized outgoing calls on that line, comprising:
   a programmable memory for storing a numerical memorized authorization code;
   means for monitoring dialled signals on the line;
   means for encoding the monitored signals;
   means for comparing the encoded signals with:
   (a) an access code and
   (b) the memorized authorization code;
   call barring means including line release means, for effecting temporary line release during or on completion of dialling to prevent at least some types of outgoing calls;
   a switching control responsive to the comparing means for switching the call barring means between a deactivated condition permitting outgoing calls and an activated condition, wherein the switching control is effective
   (a) when the call barring means is deactivated, to switch the call barring means to its activated condition and to actuate the line release means to effect temporary line release when the comparing means indicates that the encoded signals match the access code,
   (b) when the call barring means is activated, to switch the call barring means to its deactivated condition when the comparing means indicates that the encoded signals match the memorized authorization code, and
   (c) whether the call barring means is activated or deactivated, to actuate the line release means to effect temporary line release when the comparing means indicates that the encoded signals match the memorized authorization code; and
   reprogramming means, enabled when the call barring means is in its deactivated condition and the encoded signals match the access code, for replacing the authorization code in the memory with a subsequently dialled monitored and encoded signal.

4. A control according to claim 3, wherein the reprogramming means is organized to set the call barring means to its activated condition after entry of a new authorization code.

5. A control according to claim 3, including means for utilizing power supplied over the telephone line to power the telephone line access control.

6. A control according to claim 3, incorporated into a telephone line junction box or socket.

7. A control according to claim 3, wherein the means for monitoring dialled signals on the line comprises means for distinguishing between pulse trains on the line and intervals between successive pulse trains to identify successive dialled digits.

8. A control according to claim 7, wherein the means for monitoring dialled signals on the line includes means for counting the number of pulses in each identified pulse train, to distinguish between different dialled digits.

9. A control according to claim 3, wherein the means for monitoring dialled signals on the line includes means for detecting the frequency of each identified tone burst train, to distinguish between different dialled digits.

10. A control according to claim 3, further including means for monitoring the line condition to identify actuation of a telephone hook-switch, and means for initializing the call barring means when the monitored line condition indicates a transition from an off-hook to an on-hook condition.

11. A control according to claim 3, further including means for initializing the call barring means in response to a short duration initialization signal generated when the monitored line condition indicates a transition from an on-hook to an off-hook condition.

12. A control according to claim 10, further including means for initializing the call barring means in response to a short duration initialization signal generated a short time delay after the monitored line condition indicates the transition from an on-hook to an off-hook condition.

13. A control according to claim 3, further including means for preventing unintended connections to telephone network subscribers with short telephone numbers, which means is effective, when the call barring means is activated, to activate the temporary line release means after each two dialled digits have been monitored on the line whether or not those two dialled digits match the respective pair of digits of the authorization code.

14. A control according to claim 3, wherein even when activated the call barring means allows uninterrupted dialling out of the telephone number of the emergency services.

15. A telephone line access control for preventing unauthorized outgoing calls on that line, comprising:
   a programmable memory for storing a numerical memorized authorization code;
   means for monitoring dialled signals on the line;
   means for encoding the monitored signals;
   means for comparing the encoded signals with:
      (a) a plurality of access codes and
      (b) the memorized authorization code;
   call barring means including line release means, for effecting temporary line release during or on completion of dialling to prevent at least some types of outgoing calls;
   a switching control responsive to the comparing means for switching the call barring means between a deactivated condition permitting outgoing calls and a plurality of activated conditions, wherein the switching control is effective
      (a) when the call barring means is deactivated, to switch the call barring means to one of its activated conditions and to actuate the line release means to effect temporary line release when the comparing means indicates that the encoded signals match one of the access codes,
      (b) when the call barring means is activated, to switch the call barring means to its deactivated condition when the comparing means indicates that the encoded signals match the memorized authorization code, and
      (c) whether the call barring means is activated or deactivated, to actuate the line release means to effect temporary line release when the comparing means indicates that the encoded signals match the memorized authorization code; and
   reprogramming means, enabled when the call barring means is in its deactivated condition and the encoded signals match one of the access codes, for replacing the authorization code in the memory with a subsequently dialled monitored and encoded signal.

16. A control according to claim 15, wherein the call barring means is switchable between a number of activated conditions including:
   a first condition permitting only local calls:
   a second condition permitting only local and long-distance calls:
   a third condition permitting only calls to a repertory of preselected numbers: and
   a fourth condition permitting no outgoing calls except to emergency services.

17. A control according to claim 16, wherein the comparing means is capable of recognizing and distinguishing between a number of access codes corresponding to the respective activated conditions of the call barring means, and the switching control is effective to switch the call barring means from one of its activated conditions to another only on recognition of both the memorized authorization code and an appropriate one of the access codes.

18. A control according to claim 17, wherein the switching control includes means for switching the call barring means from its deactivated condition to one of its activated conditions on recognition of the appropriate one of the access codes.

19. A control according to claim 15, wherein the reprogramming means is organized to set the call barring means to one of its activated conditions after entry of a new authorization code.

20. A control according to claim 15, including means for utilizing power supplied over the telephone line to power the telephone line access control.

21. A control according to claim 15, incorporated into a telephone line junction box or socket.

22. A control according to claim 15, wherein the means for monitoring dialled signals on the line comprises means for distinguishing between pulse trains on the line and intervals between successive pulse trains to identify successive dialled digits.

23. A control according to claim 22, wherein the means for monitoring dialled signals on the line includes means for counting the number of pulses in each identified pulse train, to distinguish between different dialled digits.

24. A control according to claim 15, wherein the means for monitoring dialled signals on the line includes means for detecting the frequency of each identified tone burst, to distinguish between different dialled digits.

25. A control according to claim 15, further including means for monitoring the line condition to identify actuation of a telephone hook-switch, and means for initializing the call barring means when the monitored line condition indicates a transition from an off-hook to an on-hook condition.

26. A control according to claim 25, further including means for initializing the call barring means in response to a short duration initialization signal generated when the monitored line condition indicates a transition from an on-hook to an off-hook condition.

27. A control according to claim 25, further including means for initializing the call barring means in response to a short duration initialization signal generated a short time delay after the monitored line condition indicates the transition from an on-hook to an off-hook condition.

28. A control according to claim 15, further including means for preventing unintended connections to telephone network subscribers with short telephone numbers, which means is effective, when the call barring means is activated, to activate the temporary line release means after each two dialled digits have been monitored on the line whether or not those two dialled digits match the respective pair of digits of the authorization code.

29. A control according to claim 15, wherein even when activated the call barring means allows uninterrupted dialling out of the telephone number of emergency services.

* * * * *